United States Patent [19]

Kojima et al.

[11] Patent Number: 4,973,814
[45] Date of Patent: Nov. 27, 1990

[54] CONTROLLER FOR RESISTANCE WELDING MACHINE

[75] Inventors: Koji Kojima, Saitama; Kiyoshi Kajiwara, Tokyo, both of Japan

[73] Assignee: Kabushiki Kaisha Tetrak, Tokyo, Japan

[21] Appl. No.: 421,999

[22] Filed: Oct. 16, 1989

[30] Foreign Application Priority Data

Aug. 9, 1989 [JP] Japan ................................ 1-204604

[51] Int. Cl.⁵ ............................................. B23K 11/24
[52] U.S. Cl. ...................................... 219/110; 219/108
[58] Field of Search ................................ 219/108, 110

[56] References Cited

U.S. PATENT DOCUMENTS 4,717,805 1/1988 Miyagawa ........................... 219/110

Primary Examiner—Clifford C. Shaw
Attorney, Agent, or Firm—Ladas & Parry

[57] ABSTRACT

An inverter-type resistance welding machine includes a keyboard for inputting desired welding current command data corresponding to commanded values, a display unit for displaying, in the form of a numerical table or graph, the welding current command pattern data inputted by the keyboard, a memory for storing a plurality of the welding current command patterns set by the keyboard and from which these patterns are read out in response to a selection command from the keyboard to serve as a control command of the inverter, and acceptability decision means which successively accepts detected welding current at the time of welding for making a comparison with the reference welding current command pattern over a full range of values, checking correlation between the detected welding current and the reference welding current command pattern and determining whether the detected welding current lies within a predetermined tolerance.

4 Claims, 7 Drawing Sheets

FIG. 6

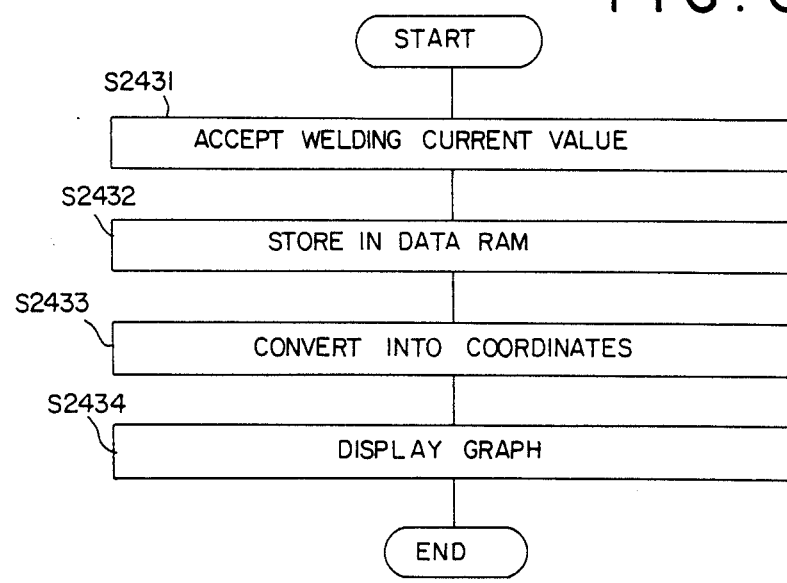

```
            START
              │
    S2431     ▼
   ┌──────────────────────────┐
   │ ACCEPT WELDING CURRENT VALUE │
   └──────────────────────────┘
              │
    S2432     ▼
   ┌──────────────────────────┐
   │    STORE IN DATA RAM      │
   └──────────────────────────┘
              │
    S2433     ▼
   ┌──────────────────────────┐
   │   CONVERT INTO COORDINATES │
   └──────────────────────────┘
              │
    S2434     ▼
   ┌──────────────────────────┐
   │      DISPLAY GRAPH        │
   └──────────────────────────┘
              │
              ▼
            END
```

FIG. 7

PATTERN No.= 01

| STEP | TIME (ms) | CURR (A) | STEP | TIME (ms) | CURR (A) |
|------|-----------|----------|------|-----------|----------|
| ① | 000 | 0000 | ⑦ | 150 | 2000 |
| ② | 010 | 0500 | ⑧ | 200 | 0000 |
| ③ | 020 | 0500 | ⑨ | | |
| ④ | 040 | 1500 | ⑩ | | |
| ⑤ | 100 | 1500 | ⑪ | | |
| ⑥ | 101 | 2000 | ⑫ | | |

CONTROLLER FOR RESISTANCE WELDING MACHINE

BACKGROUND OF THE INVENTION

This invention relates to a resistance welding machine and, more particularly, to a resistance welding machine in which a welding current pattern having any desired waveform can be set, and in which the correlation between the set current pattern and an actual welding current pattern can be checked.

In recent years, inverter-type power supply apparatus for resistance welding machines have spread rapidly in view of their ability to satisfy the demand for welding current controllability, power conservation and smaller size. The scope of utilization of such resistance welding machines extends from large-scale facilities, the foremost of which is an assembly line for automobile parts, to small-scale facilities such as those for bonding electronic parts and integrated chips. Moreover, there are a wide variety of welding materials which can be used, beginning with metal materials that have been surface treated.

Resistance welding involves passing a current at right angles into the contacting portions of metal members to be joined, melting the contacting portions by utilizing the Joule heat produced, and joining the metals by applying pressure. Therefore, in order to achieve high-quality welding of sufficient welding strength without splashing and thermal deformation, the waveform of the current passed through the contacting portions of the metal members is of great importance.

A pattern of the kind shown in FIG. 10 is well known as an example of a current waveform pattern suitable for such resistance welding.

As shown in FIG. 10, the current waveform pattern includes a rising interval T1 corresponding to a preheating stage during which splashing is suppressed and an excellent welding finish obtained, an interval T2 which is the principal current-feed stage for obtaining welding strength, and a decaying interval T3 which is a postheating stage for eliminating deformation caused by welding heat.

Conventionally, digital switches for time and current corresponding to each interval are provided as means for setting the time and crest value of each interval of the aforementioned current waveform, and the arrangement is such that the time and crest value of each interval is set by manually operating these digital switches to obtain the overall current waveform shown in FIG. 10.

In judging the success or failure of a welding operation when carrying out welding in accordance with the welding current command pattern set as described above, the crest value at the time of principal current feed shown in FIG. 10 is measured and the acceptability of the welding operation is judged depending upon whether the measured value falls within a preset range of set values.

With the resistance welding machine of the kind set forth above, the welding current is set by the digital switches, which means that only one welding current pattern can be set by one set of digital switches. Accordingly, when it is attempted to set a plurality of welding current patterns, it is necessary to provide a plurality of digital switch sets. This is attended by an increase in the number of digital switches, an increase in the size of the setting apparatus, a more complicated and laborious operation for setting the welding current value and higher cost. Thus, the conventional arrangement is far from practical.

Accordingly, the state of the art is such that a uniform welding current waveform is set by one set of digital switches in the conventional digital switch configuration.

When judging the acceptability of the welding results in conventional resistance welding, the method adopted is to detect the crest value at principal current feed and perform a comparison to determine whether the detected value lies within a preset range of reference values. If the detected value lies within the range of reference values, therefore, any abnormalities that might develop, such as splashing on the surface of the welded object after welding or the occurrence of thermal deformation, cannot be detected at the welding stage.

SUMMARY OF THE INVENTION

An object of the present invention is to provide a resistance welding machine in which a plurality of different welding current command patterns can be set at will and with facility in conformity with welding conditions by a single input means, and in which it is possible to select the set command patterns.

Another object of the present invention is to provide a resistance welding machine in which a disparity between a welding current command pattern and an actual welding current waveform can be recognized visually.

Still another object of the present invention is to provide a resistance welding machine in which more accurate and highly reliable monitoring of welding results is made possible.

According to the present invention, the foregoing objects are attained by providing an inverter-type resistance welding machine for obtaining a welding current conforming to a commanded value by controlling an inverter in accordance with a command signal, comprising input means for inputting welding current command data at will corresponding to the commanded value, display means for displaying, step by step, the welding current command pattern data inputted by the input means upon subjecting the data to numerical table processing or graph processing, memory means for storing a plurality of the welding current command patterns set by the input means and from which these patterns are read out in response to a selection command from the input means to serve as a control command of the inverter, and acceptability decision means which successively accepts detected welding current at the time of welding for making a comparison with the reference welding current command pattern over a full range of values, checking correlation between the detected welding current and the reference welding current command pattern and determining whether the detected welding current lies within a predetermined tolerance.

The resistance welding machine further comprises means for converting the successively accepted welding current values into coordinates at the time of welding and displaying the coordinates in superimposed form on the reference welding current command pattern displayed on the display means.

In operation, welding current command pattern data desired by the operator are inputted by manipulating the input means, whereupon these data are successively stored in the memory means. The inputted data are displayed on the display means in the form of a numerical table or graph upon being subjected to numerical table or graph processing.

Accordingly, a welding current waveform or numerical values in the numerical value table can be set at will while the state of the display is ascertained.

When a selection command is inputted from the input means at the time of welding, the designated welding current command pattern data are sequentially read out of the memory means and the welding current is controlled based on the read command values. The welding current produced in concurrence with welding is successively accepted by the acceptability decision means where it is compared with the reference command pattern over the entire range to determine whether the welding current lies within the predetermined tolerance. Whether the welding current is acceptable or not is judged upon checking the correlation between the welding current and the reference command pattern. This makes possible accurate, highly reliable monitoring.

Further, the detected welding current is converted into coordinates and displayed as a graph superimposed on the reference welding current command pattern displayed by the display means. This makes it possible to verify the results of welding at a single glance.

Other objects of the present invention will become clear from the description and claims based on the accompanying drawings.

BRIEF DESCRIPTION OF THE DRAWINGS

FIG. 6 is a flowchart illustrating an interrupt processing procedure in the embodiment;

FIG. 7 is an explanatory view illustrating an example for a case where a current command pattern is set and displayed in the form of a table in accordance with the embodiment;

DESCRIPTION OF THE PREFERRED EMBODIMENT

An embodiment of the present invention will now be described in detail with reference to the accompanying drawings.

Figure 1:
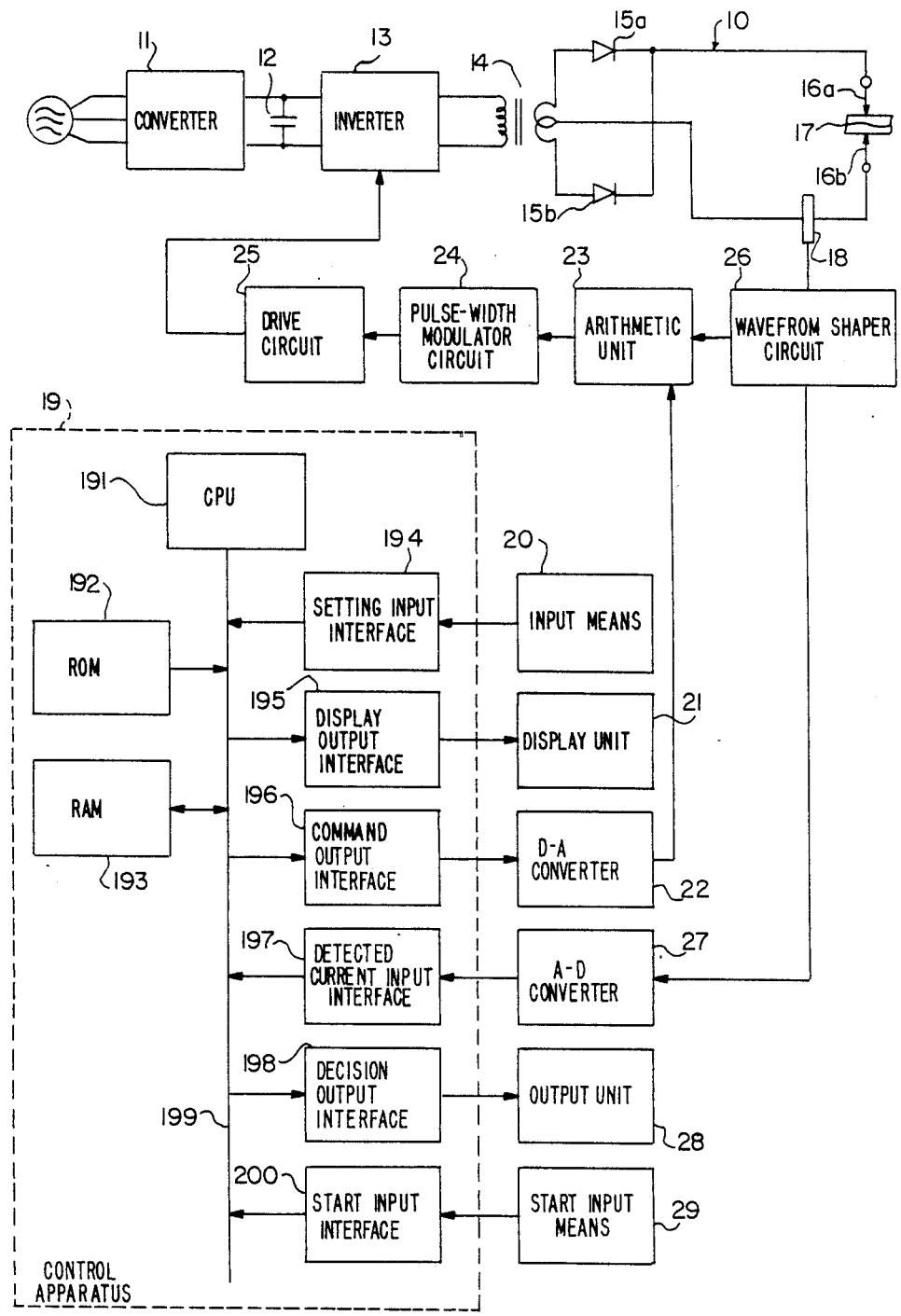
FIG. 1 is a block diagram illustrating the entirety of a resistance welding machine according to the present invention.

FIG. 1 is an block diagram illustrating an embodiment of a resistance welding machine according to the present invention.

With reference to FIG. 1, numeral 10 denotes an inverter-type resistance welding machine comprising a converter 11 for converting three-phase alternating current into direct current, a capacitor 12 for smoothing the DC output of the converter 11, an inverter 13 for converting the smoothed direct current into alternating current having a predetermined frequency, a welding transformer 14 connected to the AC output terminals of the inverter 13, diodes 15a, 15b for rectifying a high-frequency current induced on the secondary side of the welding transformer 14, and welding electrodes 16a, 16b for supplying the welding current rectified by the diodes 15a, 15b to members 17 to be welded. Numeral 18 denotes a current sensor comprising a toroidal coil or the like for detecting the welding current which flows into the welding electrodes 16a, 16b.

Numeral 19 denotes a control apparatus for controlling the resistance welding machine 10, setting welding current command patterns and controlling monitoring. The control apparatus 19 comprises a central processing unit (hereinafter referred to as a CPU) 191 for exercising overall control, a program memory (hereinafter referred to as a ROM) 192 which stores programs for processing various inputs and outputs, processing for displaying inputs and outputs, processing for judging the acceptability of welding and various other types of processing, a data memory (hereinafter referred to as a RAM) 193 for storing the results of processing executed by the CPU 191 as well as set welding current command pattern data, a set input interface 194 for inputting various setting signals, a display output interface 195 for outputting display data processing by the CPU 191, an output interface 196 for outputting command pattern data, an input interface 197 for inputting detected welding current, and an output interface 198 for outputting welding acceptability judgment data. These components are connected to the CPU 191 of the resistance welding machine via a bus 199.

Figure 2:
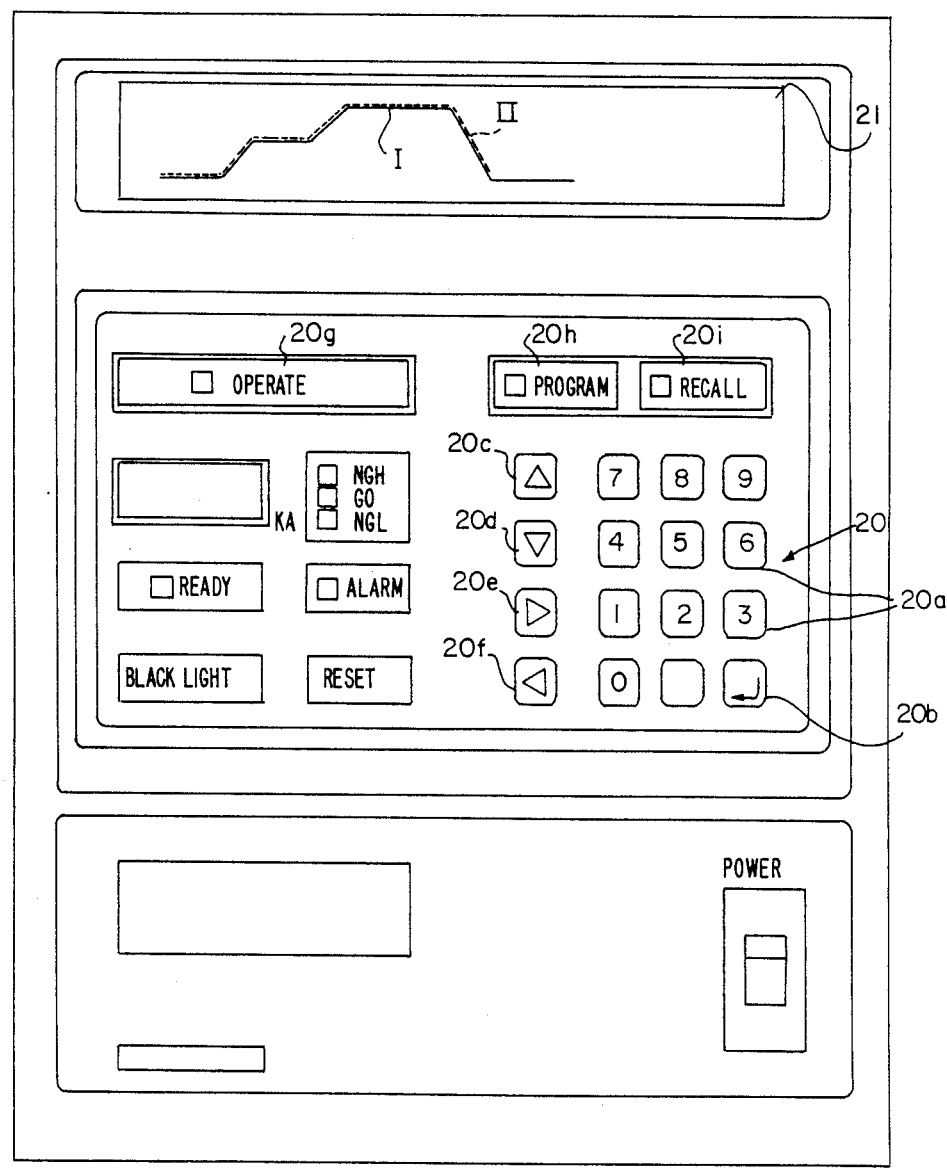
FIG. 2 is an external view of a controller and shows the positional relationship between input means and a display section in an embodiment of the present invention.

Input means 20 is connected to the set input interface 194. As shown in FIG. 2, the input means 20 comprises a keyboard having a ten-key pad 20a, a return key 20b, cursor moving keys 20c–20f, an operate key 20g, a program key 20h and a recall key 20i, and is adapted so that data for setting welding current command patterns can be entered from the keyboard.

With reference again to FIG. 1, a display unit 21 comprising an LCD is connected to the display output interface 195. The display unit 21 is adapted to display welding current command pattern data entered from the input means 20 in the form of a numerical table or graph, and to display a current waveform at the time of welding.

A D/A converter 22 for converting a command value into an analog quantity is connected to the output interface 196 for the command pattern data and outputs a command signal fed into an arithmetic unit 23. The latter calculates an error between the command signal and the welding current sensed by the current sensor 18. The resulting error signal enters a pulse-width modulator circuit 24 which controls the inverter 13. A pulse signal outputted by the pulse-width modulator circuit 24 is supplied to the inverter 13 via a drive circuit 25, so that a welding current proportional to a command pattern will be supplied to the welding electrodes 16a, 16b of the resistance welding machine 10. The signal from the current sensor 18 indicative of the detected current has its waveform shaped by a waveform shaper circuit 26 before entering the arithmetic unit 23. This output of the waveform shaper circuit 26 indicative of the welding current is also converted into a digital quantity by an A/D converter 27, with the digital quantity being accepted by the CPU 191 through the input interface 197.

An output unit 28 is connected to the output interface 198 for judging welding acceptability. The output unit 28 outputs the results of the welding acceptability judgment and comprises an open collector or relay contacts.

The operation of the present embodiment constructed as set forth above will now be described with reference to FIGS. 3 and 4.

Figure 3:
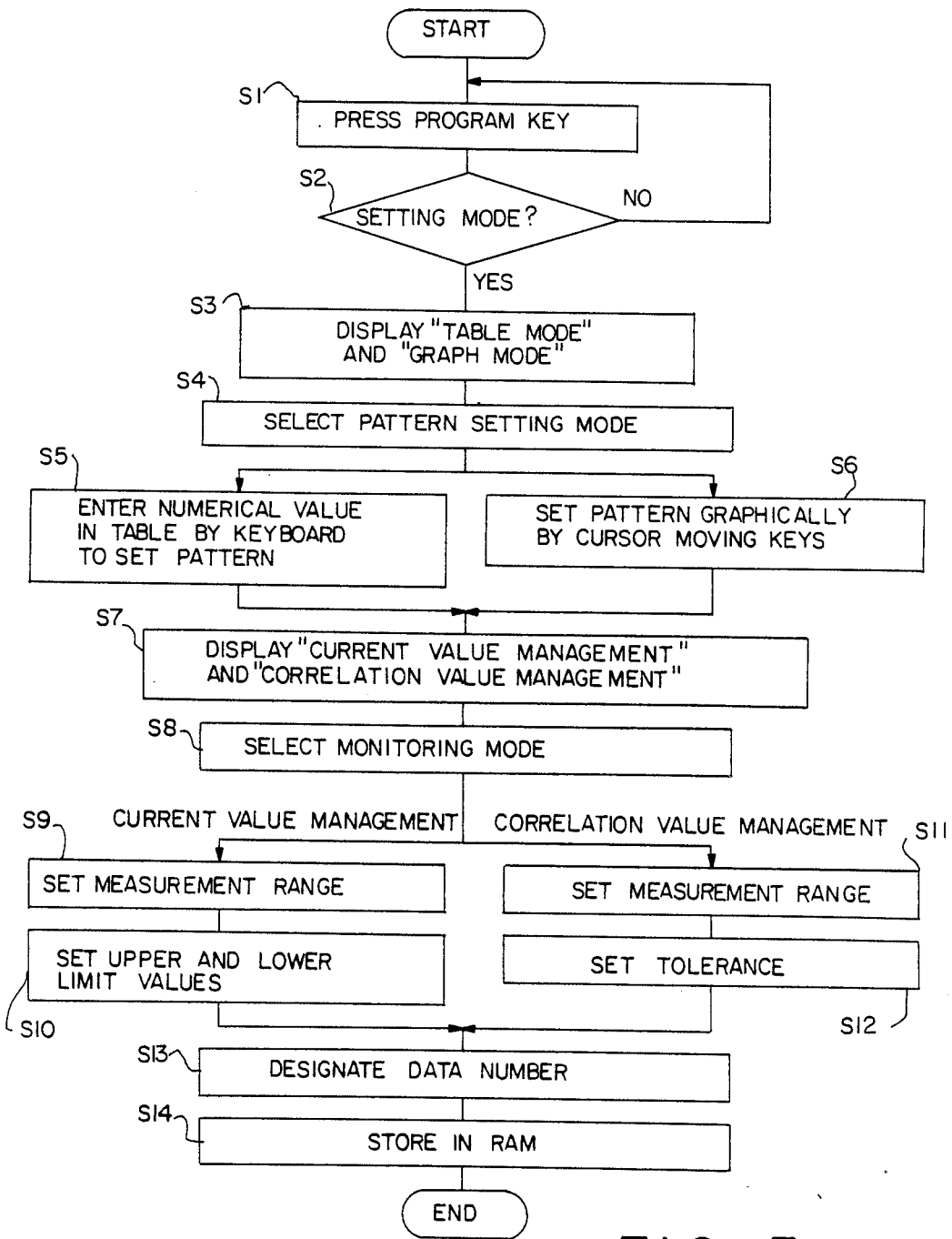
FIG. 3 is a flowchart illustrating a processing procedure for setting welding current according to the embodiment.
Figure 4:
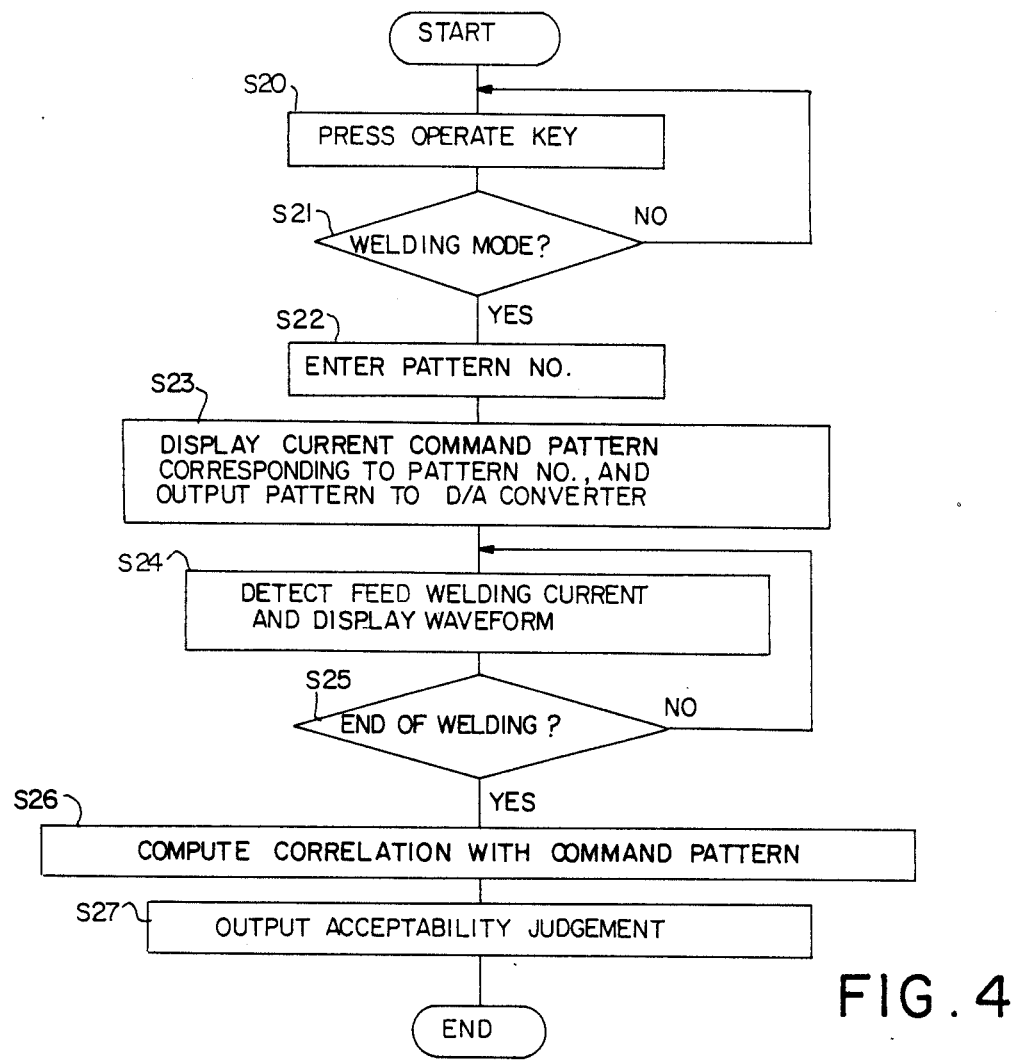
FIG. 4 is a flowchart illustrating a processing procedure at the time of welding according to the embodiment.

FIG. 3 is a flowchart illustrating a processing procedure executed when setting welding current, and FIG. 4 is a flowchart illustrating a processing procedure executed at the time of welding.

In setting welding current, first the operator presses the program key 20h on the keyboard of the input means 20 (step S1). In response, the control apparatus 19 determines whether the prevailing mode is a setting mode (step S2). When it is determined that the setting mode is in effect, the program proceeds to step S3, at which a message to the effect that the setting mode is in effect is displayed on the screen of the display unit 21. Also displayed on the screen at this step is the welding current command setting mode, namely a "TABLE MODE" and a "GRAPH MODE". Next, at step S4, the operator manipulates the cursor moving keys 20c–20f to designate, by a cursor, either the "TABLE MODE" or "GRAPH MODE" displayed on the screen of the display unit 21, and then presses the return key 20b to select the pattern setting mode. If the "TABLE MODE" is selected by this operation, the program proceeds to step S5, at which the operator uses the ten-key pad 20a and return key 20b to enter, step by step, time-versus-current values in the table constituting the welding current command pattern, thereby setting a current command pattern. If the "GRAPHIC MODE" is selected, on the other hand, the program proceeds to step S6, at which the operator sets a current command pattern in the form of a graphic by means of the cursor moving keys 20c–20f.

Steps S5 and S6 will now be described in greater detail.

Figure 8:
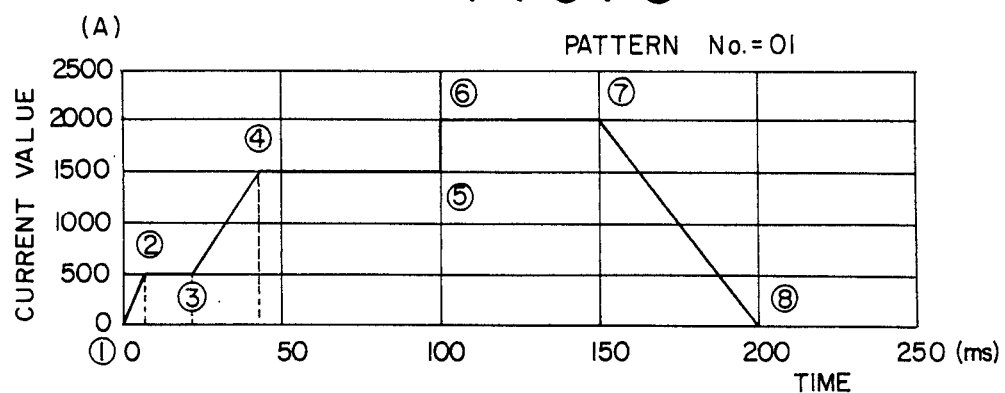
FIG. 8 is an explanatory view illustrating an example for a case where a current command pattern is set and displayed in the form of a graph in accordance with the embodiment.

In a case where a command pattern of welding current is set in the table mode, first a table shown in FIG. 7 is displayed on the screen of the display unit 21. By manipulating the ten-key pad, the operator writes time values and current values, which conform to the welding current waveform desired to be set, in time and current columns of the table corresponding to steps (1) through (12). In writing the numerical values, the time and current columns are designated in order from step (1) by manipulating the cursor moving keys 20c–20f, and the prescribed numerical values are written in, as shown in FIG. 7, by manipulating the ten-key pad 20a. These data are temporarily stored is a predetermined area of the RAM 193. When setting of the numerical values of the steps corresponding to one welding current command pattern ends, the operator presses the recall key 20i, whereby the table data in FIG. 7 are converted into a graph, upon which the graph of the current pattern is displayed on the display unit 21, as depicted in FIG. 8. By observing the graph display, the operator can verify the desired current waveform. By pressing the recall key 20i again, the table shown in FIG. 7 is displayed on the display unit 21. If there is an improper numerical value among the value set, this value can be revised.

In a case where a welding current command pattern corresponding to the table of FIG. 7 is set in the graph mode, the operator manipulates the cursor moving keys 20e and 20f to set the time values of steps (1) through (8), then manipulates the cursor moving keys 20c and 20d to set the current values of steps (1) through (8). The numerical data obtained by pressing the cursor moving keys 20c–20f are subjected to graphic processing so that a graph of the current waveform shown in FIG. 8 is automatically painted on the screen of the display unit 21. The current values and time values which result from pressing the cursor moving keys 20c, 20d and 20e, 20f are counted by a counter of software configuration constituted by the CPU 191 and a memory in the control apparatus 19, and these values become the current values and time values of the steps (1) through (8).

When the setting of the current command pattern in the table mode or graph mode is completed, the program proceeds to step S7, at which the welding current monitoring mode is displayed.

Specifically, when setting of one welding current command pattern ends, the operator presses the return key 20b on the keyboard to display "CURRENT VALUE MANAGEMENT" AND "CORRELATION VALUE MANAGEMENT", which indicate the monitoring mode, on the screen of the display unit 21. Next, at step S8, the operator selects the monitoring mode by the cursor moving keys 20a–20f and return key 20b. In a case where "CURRENT VALUE MANGAGEMENT" is selected, the program proceeds to step S9, where the range of the current waveform, shown in FIG. 8, that is to be measured is set with respect to the time axis. More specifically, by manipulating the ten-key pad 20a, for example, a range of 100–150 ms, for example, is designated as the measurement range at the time of welding. The program then proceeds to step S10, where the operator manipulates the ten-key pad 20a to set allowable upper and lower limit values of actual welding current values (average values) in the designated measurement range. These upper and lower limit values serve as reference data for judging the acceptability of the welding operation.

If "CORRELATION VALUE MANAGEMENT" is selected at step S8, on the other hand, the program proceeds to step S11, at which the measurement range of welding current is set so as to extend over the entire region of the current pattern illustrated in FIG. 8. That is, the full range of 0–200 ms is designated at this step. Thereafter, at step S12, the operator manipulates the ten-key pad 20a to set a tolerance value between actual welding current at each sampling point from the beginning to the end of welding and the set value shown in FIG. 8. The tolerance value serves as reference data for judging welding acceptability.

When the processing for setting the upper and lower limit values or for setting the tolerance value ends, the program proceeds to step S13, at which the operator manipulates the ten-key pad 20a to add a characteristic pattern number "01" to the abovementioned set data, as shown in FIGS. 7 and 8. By subsequently designating this pattern number, the set data corresponding to the current command pattern shown in FIGS. 7 and 8 can be accessed.

When the return key 20b is pressed after the setting of the data regarding the welding current command pattern is completed, a menu indicating a setting procedure is displayed on the screen of the display unit 21. If "SAVE" on this menu screen is set by the cursor and the return key 20b is pressed, then all of the set data mentioned above will be stored in the RAM 193 at the designated addresses thereof (step S14).

Figure 9A:
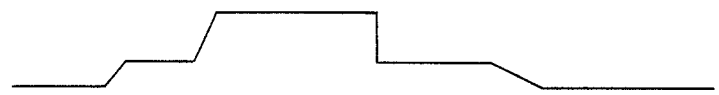
FIGS. 9(a)-(c) are explanatory views illustrating examples of current waveforms set by the embodiment.
Figure 9B:
Figure 9C:
Figure 10:
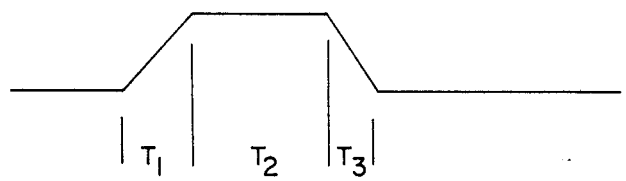
FIG. 10 is an explanatory view illustrating an example of a current waveform according to the prior art.

By executing the processing of FIG. 3 set forth above, a plurality of welding current command pattern data for waveforms that differ from one another can be set. Current waveforms set in this manner are current patterns of the kind shown in FIGS. 9(a)-(c), by way of example.

Figure 5:
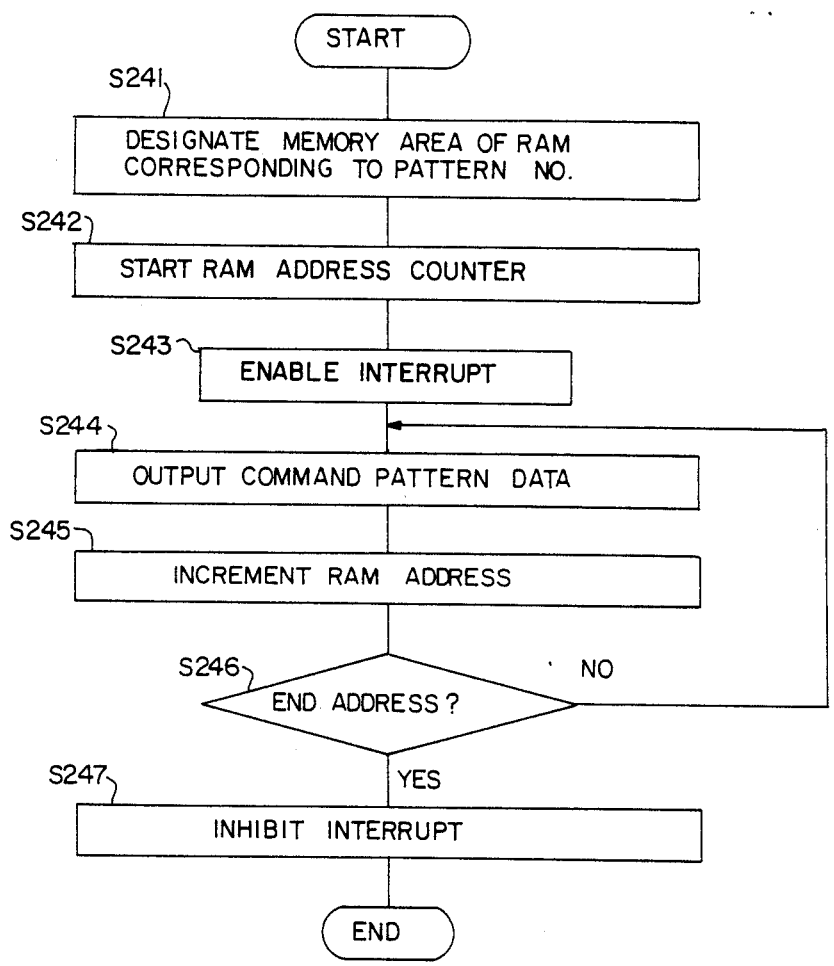
FIG. 5 is a flowchart illustrating a processing procedure when feeding a current in the embodiment.

Reference will now be had to FIGS. 4 through 6 to describe operation in a case where the resistance welding machine 10 is controlled and monitored based on a welding current command pattern set as described above.

In actual welding, first the operator presses the operate key 20g on the keyboard of the input means 20 (step S20). In response, the control apparatus 19 determines whether the welding mode is in effect (step S21). When the welding mold is determined to be in effect, the program proceeds to step S22, at which the operator manipulates start input means 20 to enter a pattern number, e.g., "01", corresponding to the current command pattern suited to the welding conditions. When the pattern number "01" is entered, the control apparatus 19 recognizes the pattern number and, using this number as an address pointer, goes to the RAM 193 to read out the welding current command pattern data corresponding to the designated pattern number "01". This pattern is displayed as a reference current pattern I on the display unit 21, as shown in FIG. 2, and is successively outputted to the D/A converter 22 with the passage of time (step S23). Concurrently, the welding current conforming to the command pattern waveform is passed into the members 17 to be welded located between the electrodes 16a, 16b of the resistance welding machine 10, and this welding current is detected and subjected to wave-shaping processing. The resulting waveform is then displayed, in superimposed form, on the reference current pattern I on the display unit 21 (step 24). The dashed line depicted in FIG. 2 is the waveform of the detected welding current. This is followed by step S25, at which it is determined whether welding is completed. If the answer is NO, then the processing of steps S24 and S25 is executed repeatedly until resistance welding based on the command pattern whose pattern number is "01" is completed.

When it is determined at step S25 that welding is completed, the welding current values accepted at the time of welding and the reference command pattern are successively compared, and the correlation thereof is computed over the entire region. The results are compared with the preset tolerance values to determine whether the welding operation is acceptable or unacceptable (step S26). The results of this acceptability determination are outputted from the output interface 198 to the output unit 28 at step S27, whereby the operator is informed of the acceptability of the welding operation.

FIG. 5 is a flowchart illustrating the processing procedure executed when passing the welding current at step S24 in FIG. 4. When the pattern number is entered from the keyboard of the input means 20 in FIG. 5, the pattern number is used as an address pointer to access the memory area of RAM 193 storing the welding current command pattern data corresponding to the pattern number (step S241). Next, at step S242, the address counter (not shown, but provided in the control apparatus 19) of the RAM 193 is started and the memory area of the RAM 193 storing the welding current command pattern data corresponding to the pattern data number is addressed from the initial address to the last address thereof. When the address counter is started, an interrupt enable is applied so that the A/D converter 27 may accept the actual welding current. In response to the interrupt, the detected values of the actual welding current are accepted in accordance with a preset sampling period.

In response to starting of the address counter, the command pattern data in RAM 193 are read out successively from the initial address thereof and these data are outputted to the D/A converter 22 through the command output interface 196 (step 244). The command pattern data outputted to the D/A converter 22 are converted into an analog quantity (voltage), which is delivered to the pulse-width modulator circuit 24 via the arithmetic unit 23. The pulse-width modulator circuit 24 outputs a pulse signal pulse-width modulated in accordance with the output signal from the arithmetic unit 23, and the pulse signal is applied to the inverter 13 via the drive circuit 25, thereby driving the inverter 13 so that the direct current from the converter 11 is converted into high-frequency alternating current. The high-frequency alternating current enters the primary side of welding transformer 14, so that a stepped-down high-frequency current is obtained on the secondary side. This current is converted into direct current by the diodes 15a, 15b, after which the direct current is supplied via the welding electrodes 16a, 16b to the members 17 to be welded. At this time, the current waveform supplied to the weld members 17 is the pattern shown in FIG. 8, by way of example.

Meanwhile, when the welding current flows into the secondary side of the welding transformer 14, the current is detected by the current sensor 18, whose output (voltage value) has its waveform shaped by the waveform shaper circuit 26. This signal is then fed back to the arithmetic unit 23, where it is compared with the reference value corresponding to the command pattern from the D/A converter, as a result of which the error between the two signals is obtained. The pulse width outputted by the pulse-width modulator circuit 24 is varied in such a manner that the aforementioned error will be zero at all times. As a result, the inverter 13 is controlled in such a manner that the welding current flowing into the weld members 17 attains the commanded value.

When the command pattern data of steps (1) to (2) shown in FIGS. 7 and 8 are outputted at step S244, the program proceeds to step S245, at which the address of the RAM 193 is incremented, and then to step S246, at which it is determined if this address is the end address. If the answer is NO, then the program returns to step S244 and the command pattern data corresponding to step (3) are outputted. Thereafter, the processing of steps S244 to S246 is repeatedly executed up to the last address of the memory area of pattern number "01". When it is determined that the prevailing address is the end address, the program proceeds to step S247, where the interrupt of welding current is inhibited. The program then returns to step S25 of FIG. 4.

FIG. 6 is a flowchart illustrating the details of the processing procedure for the interrupt-enable (step S243) in FIG. 5.

First, when the interrupt-enable is applied, the welding current values from the waveform shaper circuit 26 converted into the digital quantities by the A/D converter 27 are accepted sequentially by the CPU 191 via the input interface 197 from the start of welding (step S2431). The digital values are successively stored in a predetermined memory area of the RAM 193 at the next step, namely step S2432. By applying coordinate conversion processing to the welding current data stored in the RAM 193, these data are converted into current waveform data (step S2433). The data resulting from the coordinate conversion are outputted to the display unit 21 through the output interface 195, whereby an actual welding current waveform pattern II is displayed superimposed on the screen on which the command pattern I is being displayed, as illustrated in FIG. 2 (step S2434).

Accordingly, by simultaneously observing the command pattern I and the actual welding current waveform pattern II presented on the display screen, the operator is capable of verifying the entire welding process at a glance.

When display of the actual current waveform graph ends, the program returns to step S244 of FIG. 5.

Thus, in the present embodiment, the ten-key pad 20a, return key 21b, cursor moving keys 20c–20f and other keys on the keyboard of input means 20 are manipulated to enable command pattern data serving as welding conditions to be displayed at will in the form of a table or graph on the screen of the display unit 21. Consequently, a current waveform at setting of the command pattern can be set at will without limitations. In addition, it is possible for a plurality of these current command patterns to be set by a single input means, so that the optimum welding conditions can be set and selected for each and every welding point.

Furthermore, the actual welding current waveform can be displayed superimposed on the same display screen on which the reference command pattern waveform is displayed. As a result, the operator is capable of verifying, at a glance, the entire welding process, and therefore is capable of readily ascertaining the acceptability of the actual welding current and the potential points in comparison with the reference command pattern.

In addition, monitoring of the welding results can be performed highly accurately and reliably since the correlation between the reference command pattern and the actual current values can be checked over the entire range of welding current.

If welding strength is primarily monitored in the foregoing embodiment, it will suffice to implement the monitoring method of FIG. 3 using current value management. In a case where welding is carried out under different welding conditions at each welding point and monitoring is performed to determine whether current at preheating, main current feed and post-heating is a current value in accordance with a set value, the correlation value management mode should be utilized.

The present invention as described above has a number of advantages. Specifically, when setting a current command pattern indicative of welding conditions, the command pattern data are entered by manipulating keys on a single input means, and the data are displayed on a display screen in the form of a numerical table or graph. This makes it possible to freely and optionally set a command pattern waveform without restriction. Moreover, since set command pattern data are capable of being stored in memory, a plurality of current command patterns can be set, and optimum welding conditions in conformance with each welding point can be set and selected with facility.

Furthermore, since the waveform of a welding current which actually flows is displayed superimposed on a reference command pattern waveform displayed on the same screen, the transition of the entire welding process can be ascertained at a glance.

Moreover, monitoring of the results of welding is performed by checking the correlation between the reference command pattern and the actual current values over the entire range of welding currents. This makes it possible to perform highly reliable monitoring in accurate fashion.

It should be noted that the present invention can be modified in various ways within limits which include the gist of the invention, and that all modifications which would be evident to one skilled in the art from the following claims are covered by the scope of the invention.

What is claimed is:

1. A controller for a resistance welding machine for obtaining a welding current conforming to a commanded current data pattern by controlling a resistance welding machine in accordance with a command signal, comprising:

input means for inputting welding current command data corresponding to a commanded current data pattern;

display means for displaying, step by step, the welding current command data in graph form inputted by said input means upon subjecting the welding current command data to processing;

memory means for storing a plurality of the commanded current data patterns inputted by said input means and from which the welding current command data are read out in response to a selection command from said input means to serve as a control command of said resistance welding machine;

acceptability decision means which successively accepts detected welding current at the time of welding for making a comparison with the welding current command data over a full range of values, checking correlation between said detected welding current and said welding current command data and determining whether said detected welding current lies within predetermined tolerances; and means for converting the successively accepted welding current values into coordinates at the time of welding and displaying the coordinates in superimposed graph form on the welding current command data displayed in graph form on said display means.

2. The invention as claimed in claim 1, wherein the welding current command data is displayed in graph form on the display means upon subjecting the welding command data to numerical table processing.

3. The invention as claimed in claim 1, wherein the welding current command data is displayed in graph form on the display means upon subjecting the welding command data to graph processing.

4. The invention as claimed in claim 1, wherein the resistance welding machine is an inverter-type resistance welding machine.

* * * * *